United States Patent [19]
Durth

[11] 3,780,721
[45] Dec. 25, 1973

[54] CIRCULATING-AIR OVEN WITH FILTER
[75] Inventor: Wilfried Durth, Burbach-Wahlbach, Germany
[73] Assignee: Burger Eisenwerke A.G., Herborn/Dillkreis, Germany
[22] Filed: Apr. 24, 1972
[21] Appl. No.: 247,160

[30]    Foreign Application Priority Data
        Apr. 30, 1971    Germany................ P 21 21 367.2

[52] U.S. Cl............................................. 126/21 A
[51] Int. Cl. ........................................... F24c 15/32
[58] Field of Search...................... 126/21; 219/400

[56]            References Cited
                UNITED STATES PATENTS
2,887,383    5/1959    Kopf................................. 126/21 A
2,582,887    1/1952    Sanford et al. ................... 126/21 A
2,491,420    12/1949   Scott................................. 126/21 A

*Primary Examiner*—Edward G. Favors
*Attorney*—Karl F. Ross

[57]                ABSTRACT

A fan is provided in an oven chamber and draws air axially in through a hood and expels it radially outwardly over a heating element to heat a foodstuff. A filter is provided across the mouth of the hood. The bottom of the chamber is dished upwardly concave and is provided at its lowest point with an outlet opening into a receptacle pan which catches condensate dripping from the filter. This filter is a stack of screens held in place in a frame by a retaining element having laterally projecting pins which engage slots in the frame bayonet-fashion and which are received in holders provided in the frame.

7 Claims, 3 Drawing Figures

PATENTED DEC 25 1973 3,780,721
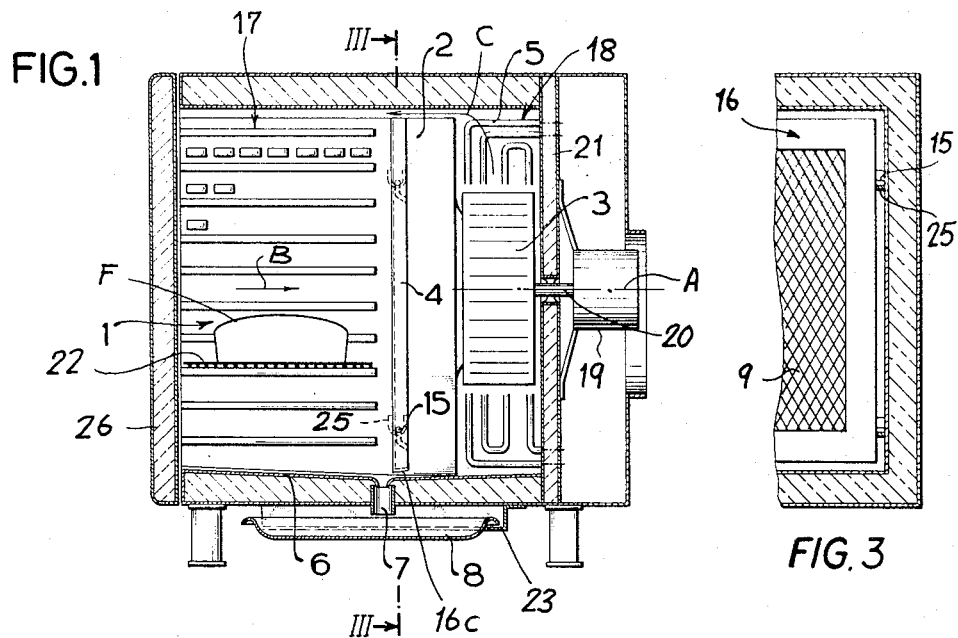
FIG.1
FIG.3
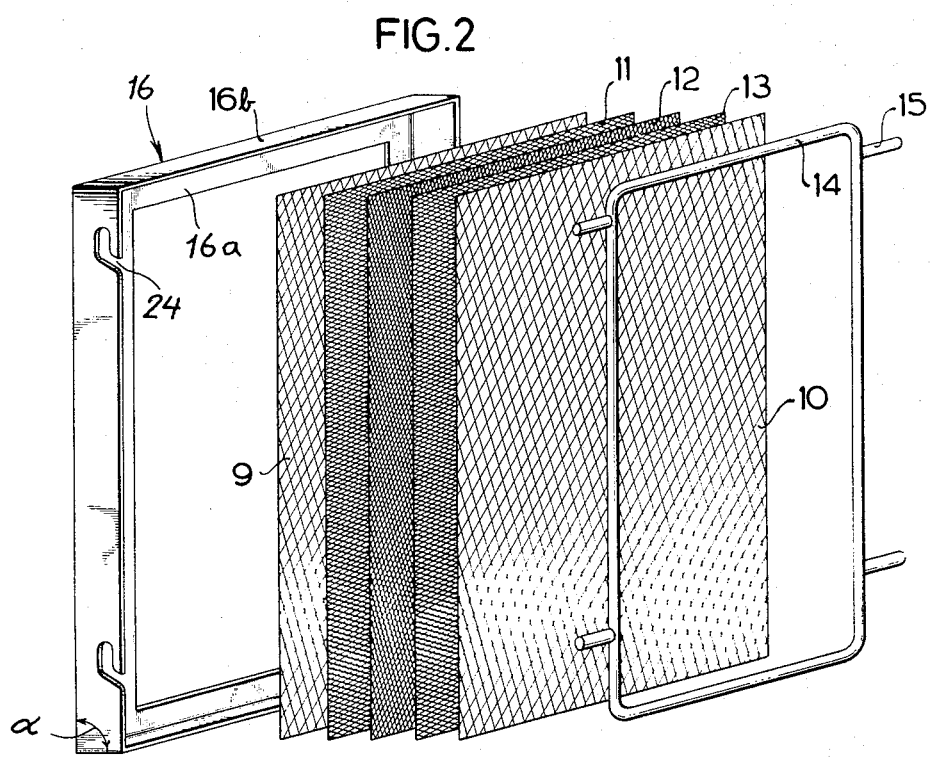
FIG.2

CIRCULATING-AIR OVEN WITH FILTER

FIELD OF THE INVENTION

The present invention relates to a food-treatment apparatus and, more particularly, a cooking or thawing oven having an internal blower for internal forced air circulation.

BACKGROUND OF THE INVENTION

There is described in the commonly assigned U.S. Pat. No. 3,550,576, issued 29 Dec. 1970 to Paul Sauer, a food-treatment apparatus wherein an oven chamber is divided into two compartments. The food to be treated is supported in one of the compartments and an axial-input radial-output fan in the other compartment cooperates with a heating element in that compartment for the forced circulation of heated air throughout the two compartments.

When such an apparatus is used to cook fatty or moist foods, as for instance in a roasting operation, grease and water vapor are circulated with the heated air. Then air-carried substances may be redeposited on the food and/or condense upon the walls and other woven surfaces, collecting other contaminants and carbonizing thereon.

It has been suggested to filter out such grease and water, or to catch it at the fan. Both of these systems have certain limitations. The prior-art filter often clogged, greatly reducing hot-air circulation and creating a fire hazard. Also, the fan tended to atomize the contaminants, rather than trap them.

OBJECTS OF THE INVENTION

It an object of the present invention to provide an improved food-treatment apparatus of the above-described general type.

Another object is the provision of a cooking oven having a filter which will not clog and which does not require disassembly of the entire oven for servicing.

Yet another object is to provide such an improved oven wherein virtually all of the grease and water vapor is removed from the circulated air as it passes through the filter.

SUMMARY OF THE INVENTION

I attain these objects by providing a condensing filter in the air-circulation path which intercepts and catches the grease droplets entrained by the circulating air. The filter consists of a stack of metal-wire screens of low corrosivity (stainless steel) in a metal frame such that the filter has a high thermal conductivity but low heat capacity. The bottom of the oven chamber is formed as an upwardly concave (dished) surface having at its lowest point an orifice opening outside the oven into a grease-collecting pan. Thus the condensate or filtrate will flow down the filter, drip to the oven floor, and flow out through the orifice into the receptacle arranged thereunder.

The filter is actually a heat exchanger with rapid heat-dissipation characteristics on which water vapor and grease condense. Any airborne solid particles attach themselves to the wet screens and this condensate, carrying the solid particles, runs off the bottom of the filter. Since the action is primarily one of condensation, because the screens can be cooler than the dewpoint of the circulated air, rather than filtration, relatively open screens are used.

DESCRIPTION OF THE DRAWING

The above and other objects, features, and advantages will become more readily apparent from the following description, reference being made to the accompanying drawing in which:

FIG. 1 is an axial section through an apparatus according to the present invention;

FIG. 2 is a perspective exploded view of the filter according to this invention; and FIG. 3 is a section taken along line III—III of FIG. 1.

SPECIFIC DESCRIPTION

The apparatus according to the present invention has a food-treatment chamber 1 subdivided by a large rectangular hood 2 into a food compartment 17 adapted to receive a foodstuff and a blower compartment 18 provided with a fan 3. A motor 19 mounted outside the chamber 1 has a shaft 20 passing through a back wall 21 of the chamber 1. This chamber 1 has a door 26 which, like its side, top bottom and end walls, is formed of a pair of metal skins sandwiching a body of insulating material between them.

The blower 3, having an axis A, is of the axial-input radial-output type and draws air in through the hood 2 in the direction shown by arrow B and expels it outwardly as shown by arrow C.

An electric heating element 5 is provided in the chamber 18 to heat the air as it is expelled by the blower 3. Thus this apparatus is used to bake, roast, or thaw a foodstuff F suspended on a rack 22 in the compartment 17.

The oven has a dished bottom 6 formed as a slightly upwardly concave or downwardly and inwardly sloped floor provided at its lowest point, which lies substantially at the division line between chambers 17 and 18, with an outlet orifice 7 which opens downwardly outside the chamber 1 above a catch pan 8 suspended on a rack 23 below the oven.

A filter 4 is provided across the mouth of the hood 2 turned away from the fan 3. This filter lies slightly behind the orifice 7. As best seen in FIG. 2 the filter 4 comprises a stack of rectangular metal screens 9–13 through which the air is aspirated in direction B. More specifically, the stack comprises two large-mesh outer screens 9 and 10 sandwiching three small-mesh inner screens 11, 12 and 13. The screens 9–13 all have elongated diamond-shaped mesh openings with the openings of screens 9, 12 and 10 running longitudinally of the screens, and the openings of interleaved screens 11 and 13 running transversely. Air can easily pass such a filter along a meandering path so that a light-duty fan may be used.

The screens 9–13 are stacked in a rectangular metal frame 16 of L-section. the frame 16 has a flat front 16a and a flange 16b extending back therefrom with the screen 9 resting against the front 16a. At its base the flange 16b is bent at the angle $\alpha$ of around 75° to the front whereas around the other three sides the flange 16b forms a 90° angle to the face 16a. In this manner the condensate running down the filter 4 will drip off its front edge 16c almost directly above the orifice 7.

The sides of the frame 16 are formed with slots 24 which are open at their lower ends. A rectangle 14 of heavy chromium-plated wire has on each sides two laterally extending pins 15 which fit bayonet-fashion into these notches 24 to hold the stack 9–13 snugly in place in the frame 16. In addition these pins 15 are received in upwardly open U-shaped holders 25 provided on the inside wall of the chamber 1 to hold the filter 4 in place over the mouth of the hood 2.

Unlike prior-art ovens of this general type the condensate may be collected and disposed of without even shutting down the oven. Similarly since the great collected is constantly running off it takes an extremely long time for the filter to become clogged. Even when the filter becomes so choked with foreign matter as to impair the efficiency of the device it is very easy to remove it by lifting it out of the holders 25 and then taking it apart and passing its component parts through a dishwashing machine. Since the filter is provided at the intake side of the fan, its temperature will be lower than that either of the food so that water vapor and grease droplets will naturally condense on it.

I claim:
1. A food-treatment apparatus comprising:
 a closed chamber having a downwardly sloping floor formed at its lowest point with an outlet orifice;
 means for circulating a gas in said chamber along a circulation path past a foodstuff;
 means in said path for heating said gas; and
 a filter in said path including a stack of metal screens and a frame carrying said stack.
2. The apparatus defined in claim 1 wherein said filter further comprises a retaining element removably engageable with said frame to hold said screens in place thereon.
3. The apparatus defined in claim 2 wherein said element has a plurality of laterally extending pins, said frame being formed with slots, said pins being receivable in said slots.
4. The apparatus defined in claim 3 wherein said chamber is provided with holders, said pins being receivable in said holders.
5. The apparatus defined in claim 4, further comprising a receptacle below said orifice, whereby condensate from said filter runs out of said orifice into said receptacle.
6. The apparatus defined in claim 5 wherein said filter is upstream in said path of said means for circulating said gas.
7. The apparatus defined in claim 6 wherein said means for circulating said gas includes a hood and an axial-input radial-output blower, said hood being in front of the input of said blower, said filter being on said hood, said screens including outer screens of wide mesh flanking a plurality of inner screens of narrow mesh, the openings of said screens being elongated and the direction of elongation of the screen openings lying at right angles to one another for alternate screens of said stack.

* * * * *